United States Patent
Ihara et al.

(10) Patent No.: US 7,884,515 B2
(45) Date of Patent: Feb. 8, 2011

(54) POWER TRANSMISSION DEVICE AND METHOD OF ASSEMBLING THE SAME

(75) Inventors: Hirotatsu Ihara, Nagoya (JP); Tetsuya Miura, Hishikamo-gun (JP); Satoru Kasuya, Hazu-cho (JP); Masashi Kito, Anjo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 0 days.

(21) Appl. No.: 12/293,902

(22) PCT Filed: Mar. 22, 2007

(86) PCT No.: PCT/JP2007/055822

§ 371 (c)(1),
(2), (4) Date: Sep. 22, 2008

(87) PCT Pub. No.: WO2007/119471

PCT Pub. Date: Oct. 25, 2007

(65) Prior Publication Data

US 2009/0115263 A1 May 7, 2009

(30) Foreign Application Priority Data

Mar. 24, 2006 (JP) .............................. 2006-082709

(51) Int. Cl.
*H02K 7/10* (2006.01)
(52) U.S. Cl. .................................................. 310/75 R
(58) Field of Classification Search ............... 310/75 R, 310/90; 29/596
See application file for complete search history.

(56) References Cited

U.S. PATENT DOCUMENTS

| 6,455,968 | B2 * | 9/2002 | Honorio et al. ......... 310/102 R |
| 2001/0010439 | A1 | 8/2001 | Klingler et al. |
| 2003/0078134 | A1 | 4/2003 | Kojima et al. |
| 2005/0206248 | A1 * | 9/2005 | Raszkowski et al. .......... 310/54 |
| 2007/0213161 | A1 | 9/2007 | Tabata et al. |
| 2007/0225098 | A1 | 9/2007 | Tabata et al. |

FOREIGN PATENT DOCUMENTS

| DE | 200 01 504 U1 | 7/2001 |
| JP | 11 299006 | 10/1999 |
| JP | 2000 190749 | 7/2000 |

(Continued)

*Primary Examiner*—Nguyen N Hanh
(74) *Attorney, Agent, or Firm*—Oblon, Spivak, McClelland, Maier & Neustadt, L.L.P.

(57) ABSTRACT

A power transmission unit includes an electric motor including a rotor arranged on an inner circumference of a stator and concentrically with the stator and a transmission mechanism for transmitting power. A portion of a predetermined constructional element of the transmission mechanism protrudes toward the stator or the rotor side coaxially with the stator or the rotor. The rotor is loosely fitted onto an outer circumferential face of the protruding portion, and a clearance is created between an outer circumferential face of the protruding portion and an inner circumferential face of the rotor into which a guide sleeve for guiding the rotor in an axial direction is inserted. The structure improves a convenience in assembling the rotor of the electric motor of the power transmission unit including the electric motor and transmission mechanism.

7 Claims, 3 Drawing Sheets

| | FOREIGN PATENT DOCUMENTS | |
|---|---|---|
| JP | 2001 213179 | 8/2001 |
| JP | 2001 246951 | 9/2001 |
| JP | 2001 268853 | 9/2001 |
| JP | 2002 165420 | 6/2002 |
| JP | 2003 61301 | 2/2003 |
| JP | 2003 127681 | 5/2003 |
| JP | 2004 136743 | 5/2004 |
| JP | 2005 170159 | 6/2005 |
| JP | 2006 9942 | 1/2006 |
| JP | 2006 232005 | 9/2006 |
| WO | 2006 030948 | 3/2006 |
| WO | 2006 035982 | 4/2006 |

* cited by examiner

|     | C1 | C2 | C3 | B1 | B2  | F1 |
|-----|----|----|----|----|-----|----|
| 1st | O  |    |    |    | (O) | O  |
| 2nd | O  |    |    | O  |     |    |
| 3rd | O  | O  |    |    |     |    |
| 4th | O  | O  |    |    |     |    |
| R   |    |    | O  |    | O   |    |
| N   |    |    |    |    |     |    |

POWER TRANSMISSION DEVICE AND METHOD OF ASSEMBLING THE SAME

TECHNICAL FIELD

This invention relates to a power transmission unit comprising a transmission mechanism and an electric motor increasing a torque inputted to the transmission mechanism and decreasing a torque outputted from the transmission mechanism, and to an assembling method thereof.

BACKGROUND ART

In the prior art, a unit composed of a combination of an internal combustion engine with an electric motor, a unit using an electric motor as a prime mover and so on are known as a power unit of a vehicle. In order to control a drive torque and speeds of the internal combustion engine and the electric motor, a transmission is employed in a vehicle having the power unit of those kinds. One example is disclosed in Japanese Patent Laid-Open No. 2003-127681. The system disclosed in Japanese Patent Laid-Open No. 2003-127681 is a hybrid vehicle drive system in which an internal combustion engine is connected with a carrier of a planetary gear mechanism, and a first motor/generator is connected with a sun gear of the planetary gear mechanism. Also, a ring gear is connected with a member of an input side of a geared automatic transmission. A member of an output side of the automatic transmission is connected with a propeller shaft, and a second motor/generator is connected with the propeller shaft through a gear pair. Thus, according to the system taught by Japanese Patent Laid-Open No. 2003-127681, the planetary gear mechanism functions as a distribution mechanism distributing an engine power to the first motor/generator and to the output side. A torque is added or absorbed by a second motor/generator in the process of transmitting the power from the distribution mechanism to the automatic transmission. Japanese Patent Laid-Open No. 2003-127681 also discloses a configuration in which the automatic transmission is arranged between the second motor/generator and the propeller shaft, and the second motor/generator is connected to an input side of the automatic transmission.

Japanese Patent Laid-Open No. 2001-268853 discloses a structure in which a motor stator is arranged in a housing, an input shaft of a transmission is arranged coaxially with the motor stator, and the input shaft is inserted into a motor rotor facing to the motor stator.

In the electric motor and motor generator disclosed in the above-explained Japanese Patent Laid-Opens Nos. 2003-127681 and 2001-268853, a rotor having a permanent magnet is used. In case of inserting the above-explained rotor into an inner circumference of a stator, a magnetic force acts between the rotor and the stator. Therefore, it is difficult to keep those rotor and stator coaxially. According to the configurations taught by Japanese Patent Laid-Opens Nos. 2003-127681 and 2001-268853, the electric motor or the motor generator is connected directly with the gear pair, and the shaft of the automatic transmission or the drive shaft. Therefore, the rotor can be inserted into the stator while being centered by fitting the rotor onto the shaft or drive shaft. However, when the electric motor or the motor generator is thus assembled, the electric motor or the motor generator is connected with another mechanism such as the gear pair or the automatic transmission. For this reason, according to the conventional art thus far explained, an inspection and a tuning of the electric motor or the motor generator cannot be carried out in the process of assembling. Even if the inspection or the tuning can be taken place, an implementation thereof is rather difficult, and accuracy thereof may be deteriorated.

DISCLOSURE OF THE INVENTION

The present invention has been conceived noting the technical problems thus far described, and its object is to improve convenience in assembling a rotor in a power transmission unit comprising an electric motor and a transmission.

In order to achieve the above-mentioned object, according to the present invention, there is provided a power transmission unit comprising an electric motor having a rotor arranged in an inner circumference of a stator and concentrically with the stator, and a transmission mechanism for transmitting power, characterized in that: a portion of a predetermined constructional element of the transmission mechanism protrudes toward the stator or the rotor side coaxially with the stator or the rotor; the rotor is loosely fitted onto an outer circumferential face of the protruding portion; and a clearance is created between an outer circumferential face of the protruding portion and an inner circumferential face of the rotor into which a guide sleeve for guiding the rotor in an axial direction is inserted.

According to the power transmission unit of the invention, the protruding portion comprises a guide portion on a portion of the outer circumferential face thereof closer to a base end side thereof than a leading end thereof, on which the guide sleeve is fitted in close contact.

According to the invention, the protruding portion includes a shaft for transmitting a power to the transmission mechanism, and a connection member for connecting the shaft and the rotor in a torque transmittable manner is interposed between the rotor and the shaft.

In addition to above, according to the invention, the rotor is positioned concentrically with the stator by the sleeve.

On the other hand, according to another aspect of the invention, there is provided an assembling method of a power transmission unit comprising an electric motor having a rotor arranged in an inner circumference of a stator and concentrically with the stator, and a transmission mechanism for transmitting power, characterized by comprising: assembling the transmission mechanism to protrude a portion of a predetermined constructional element thereof toward the stator or the rotor side coaxially with the stator or the rotor; fitting a guide sleeve onto an outer circumferential face of the protruding portion; inserting the rotor into the stator coaxially in a rotatable manner, by fitting the rotor on an outer circumferential face of the guide sleeve, and by sliding the rotor on the guide sleeve in the axial direction; and thereafter dismounting the guide sleeve from the protruding portion.

In addition to above, the above-explained assembling method of the invention is characterized by comprising: holding both axial ends of the rotor in a rotatable manner by a casing of the power transmission unit or a member integral with the casing; and thereafter dismounting the guide sleeve from the protruding portion.

According to the invention, the rotor is inserted into the stator by fitting the guide sleeve onto the portion protruding from the transmission mechanism toward the electric motor side, and by sliding the rotor on the outer circumferential face of the guide sleeve in the axial direction. Therefore, the rotor can be inserted into the stator substantially concentrically with the stator, even if the transmission mechanism is disposed on one of the sides of the electric motor and no work space is available. For this reason, the rotor can be inserted into the stator easily without contacting to the stator. Moreover, since the protruding portion passing through the center of the rotor is sufficiently isolated from the rotor, a seizing resulting from a friction between the rotor and the protruding portion can be prevented even if the assembled rotor is rotated.

In addition to the above-explained advantage, the present invention comprises the guide portion for inserting the rotor, which is composed of the portion of the base end side of the protruding portion and the guide sleeve fitted thereon. Therefore, a convenience of insertion of the rotor can be improved.

In addition to the above-explained advantage, according to the invention, the guide sleeve is fitted onto the shaft protruding from the transmission mechanism, and the rotor can be inserted by sliding the rotor on the guide sleeve in the axial direction. Therefore, the insertion of the rotor can be carried out easily. Moreover, since the shaft and the rotor are to be connected through the connection member, the rotor is disconnected from the shaft at the stage of inserting the rotor so that the rotor still can be rotated independently. Therefore, an inspection and a tuning of the electric motor can be carried out in the process of an assembling work of the power transmission unit by operating the electric motor independently.

In addition to the above-explained advantage, according to the invention, the rotor can be kept concentrically with the stator by the guide sleeve inserted between the protruding portion or the shaft and the rotor. Therefore, a convenience of insertion of the rotor can be improved.

In addition to the above-explained advantage, according to the invention, the guide sleeve is fitted onto the portion protruding from the transmission mechanism toward the electric motor side after completion of assembling of the transmission mechanism, and then the rotor is inserted by sliding the rotor on the guide sleeve in the axial direction. Accordingly, the rotor can be kept concentrically with the stator by the guide sleeve when being inserted into the stator. Therefore, the insertion of the rotor can be carried out easily. Further, since the guide sleeve is dismounted after the insertion of the rotor, the rotor can be isolated from the protruding portion. Therefore, an inspection and a tuning of the electric motor can be carried out by operating the electric motor independently.

In addition to the above-explained advantage, according to the invention, the assembled rotor is held in a rotatable manner by the casing or the member integral with the casing. Therefore, the rotor can be kept concentrically with the stator even after dismounting the guide sleeve. Furthermore, since a sufficient clearance exists between the protruding portion and the rotor, an inspection and a tuning of the electric motor can be carried out without causing a seizing of the rotor and the protruding portion.

BEST MODE FOR CARRYING OUT THE INVENTION

Figure 1:
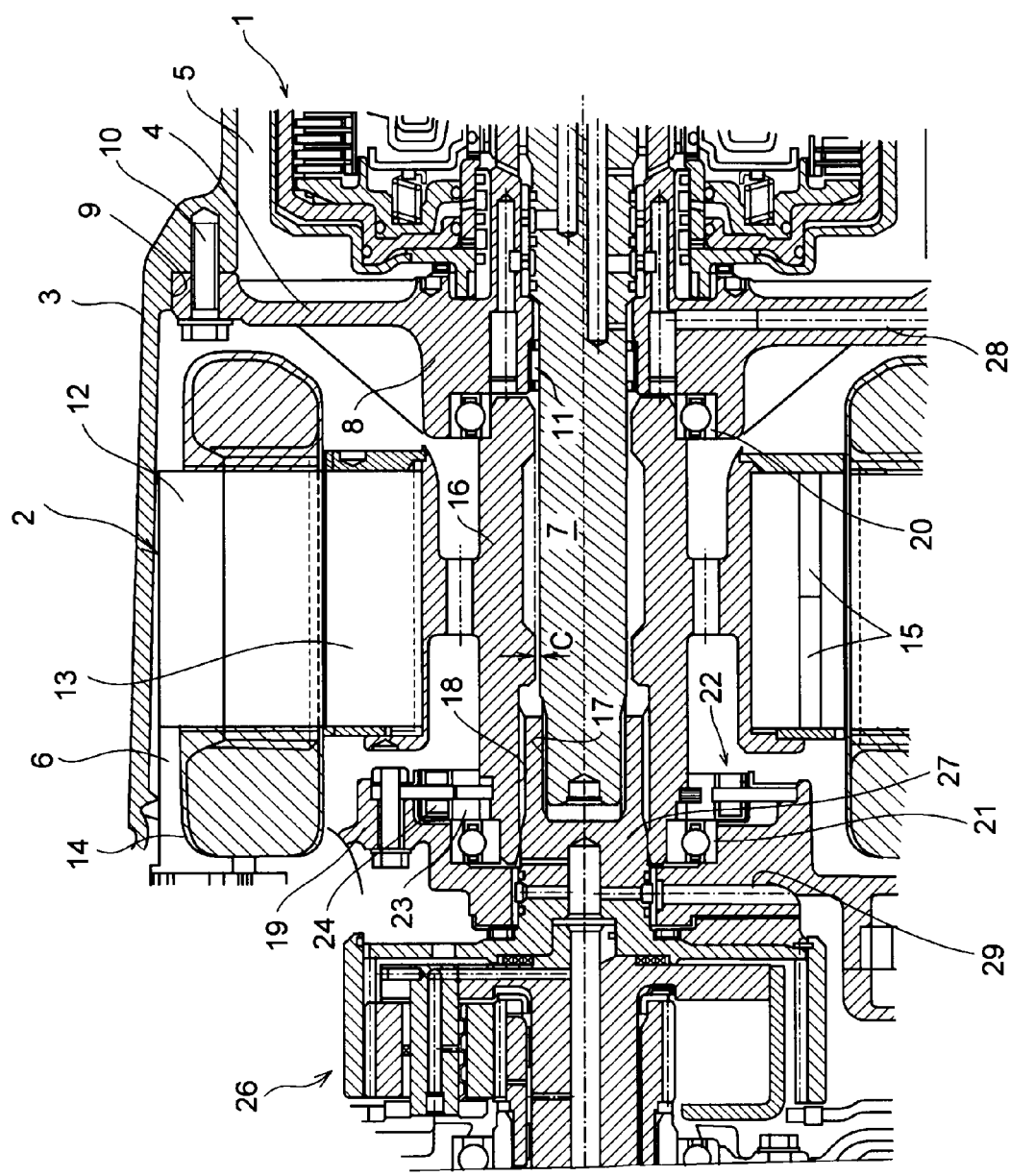
FIG. 1 is a cross-sectional view showing one example of the invention.

Next, this invention will be explained in connection with its specific example. FIG. 1 is a cross-sectional view partially showing a power transmission unit to which the invention is applied. As illustrated in FIG. 1, the power transmission unit comprises a mechanical transmission unit 1 and an electric motor 2. Those transmission unit 1 and electric motor 2 are housed in a casing 3. One of the open ends of the casing 3 (i.e., left side of FIG. 1) opens widely, and an open end of other side (i.e., right side of FIG. 1) opens narrowly to allow passage of a not shown output shaft therethrough. An internal space of the casing 3 is divided into two chambers 5 and 6 by a bulkhead 4 built inside of the casing 3. As shown in FIG. 1, the transmission unit 1 is housed in the right chamber 5, and the electric motor 2 is arranged adjacent to the bulkhead 4 in the left chamber 6.

A geared transmission mechanism, or a belt-type or toroidal type continuously variable transmission mechanism can be used as the transmission unit 1. That is, the transmission unit 1 is adapted to vary a speed change ratio by changing a power transmission route. Here will be explained an example of the geared transmission unit 1 composed mainly of a planetary gear mechanism. The transmission unit 1 comprises an input shaft 7 corresponding to the protruding portion of the invention, which penetrates the bulkhead 4 to protrude toward the chamber 6 housing the electric motor 2.

The bulkhead 4 is a plate-like member comprising a boss portion 8 on its center side. The bulkhead 4 is engaged with a spigot joint portion 9 formed on an inner circumference of the casing 3 to be centered, and fixed with the casing 3 by a bolt 10. The input shaft 7 penetrates the bulkhead 4 along a center axis of the boss portion 8 of the bulkhead 4, and the input shaft 7 is held by the bulkhead 4 in a rotatable manner through a bearing 11 fitted onto an outer circumference of the input shaft 7.

On the other hand, the electric motor 2 comprises a stator (i.e., a stationary part) 12 and a rotor (i.e., a rotary part) 13 arranged in an inner circumferential side of the stator 12 and concentrically with the stator 12. An appropriate type of an electric motor, e.g., a permanent magnet synchronous motor can be used as the electric motor 2. In this case, the stator 12 is provided with a coil 14, and the rotor 13 is provided with a permanent magnet 15. The rotor 13 comprises a cylindrical portion 16 on its inner circumferential side. A length of the cylindrical portion 16 is comparable to an axial length of the coil 14. The input shaft 7 protrudes from the end portion of the rotor 13 of the bulkhead 4 side to the other end of the rotor 13. On an outer circumferential face of a leading end of the input shaft 7, there is formed a spline 17. The aforementioned cylindrical portion 16 of the rotor 13 is fitted loosely onto the outer circumference of the input shaft 7 between the spline 17 and a base end of the input shaft 7. Specifically, a minimum inner diameter of the cylindrical portion 16 is sufficiently larger than a maximum outer diameter of the portion of the input shaft 7 protruding from the bulkhead 4, and a clearance C is formed between the inner circumferential face of the cylindrical portion 16 and the outer circumferential face of the input shaft 7. A guide sleeve Sg to be explained later is inserted into the clearance C.

The inner diameter of a portion of the cylindrical portion 16 facing to the spline 17 of the input shaft 7 is larger than the outer diameter of the spline 17. That is, a spline 18 is formed on the inner circumferential face of the cylindrical portion 16 facing to the spline 17 while keeping a distance from the spline 17.

The chamber 6 accommodating the electric motor 2 therein is defined by another bulkhead 19 attached to the inner circumference of the casing 3 and opposed to the bulkhead 4. The rotor 13 is held by the bulkheads 4 and 19 in a rotatable manner through bearings 20 and 21 fitted onto both ends of the cylindrical portion 16. As explained above, the rotor 13 is fitted loosely onto the input shaft 7 and the splines 17 and 18 are not splined to each other, therefore, the rotor 13 can be rotated independently when the rotor 13 is fitted onto the input shaft 7 and held by the bearings 20 and 21.

A rotor 23 of a resolver 22 is fitted onto an end portion of the cylindrical portion 16 of another bulkhead 19 side. Also, a stator 24 is arranged around an outer circumference of the rotor 23 to be opposed to the rotor 23 in the radial direction. The stator 24 is fixed to an inner face of aforementioned another bulkhead 19.

In the aforementioned another bulkhead 19, there is formed a boss portion 25 coaxially with the center axis of the input shaft 7. An output shaft 27 of a power distribution mechanism 26 is inserted into the boss portion 25. The output shaft 27 transmits a power from the power distribution mechanism 26 to the electric motor 2 and to the transmission unit 1. A leading end of the output shaft 27 is formed cylindrically so that the cylindrical leading end can be inserted into an inner circumferential side of the cylindrical portion 16 and fitted onto an outer circumference of the input shaft 7. Splines are formed on both inner and outer face of the cylindrical leading end of the output shaft 27 so that the cylindrical leading end is splined to the spline 18 of the rotor 13 and to the spline 17 of the input shaft 7. That is, the rotor 13 and the input shaft 7 are indirectly connected with each other in a power transmittable manner through the output shaft 27 corresponding to the connection member of the invention. Here, the power distribution mechanism 26 will be explained later.

Oil passages 28 and 29 are formed to penetrate the bulkheads 4 and 19. The oil passages 28 and 29 are adapted to feed lubricating oil or oil pressure to the transmission unit 1, the power distribution mechanism 26, and the bearings 11, 20 and 21, and to discharge the lubricating oil or oil pressure from those elements. In order to feed and discharge oil pressure through the oil passages 28 and 29, a (not shown) hydraulic control circuit is arranged underneath the casing 3. Also, a not shown oil pan housing the hydraulic control circuit is attached to the lower face of the casing 3.

Figures 2, 3:
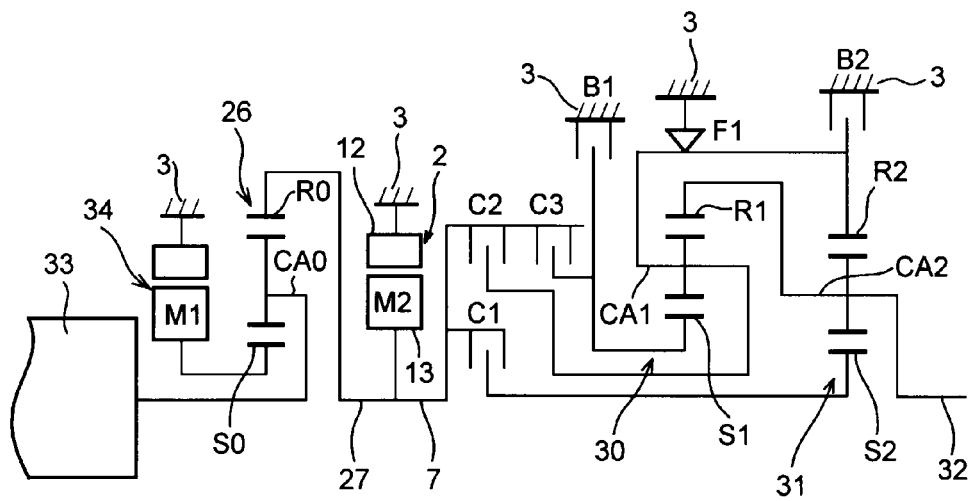
FIG. 2 is a skeleton diagram schematically showing a drive line of a hybrid vehicle comprising a power transmission unit to which the invention is applied.
FIG. 3 is a table showing a relation between gear stages and engagement states of the mechanical transmission.

The power transmission unit shown in FIG. 1 can be mounted on a hybrid vehicle, and example thereof is illustrated in FIG. 2. FIG. 2 shows an example of so-called a "2 motors hybrid drive unit" arranged in an anteroposterior direction of the vehicle. A configuration of the transmission unit 1 is explained first of all. According to the example shown in FIG. 2, the transmission unit 1 is capable of setting four kinds of speed change ratios of forward direction and one speed change ratio of reverse direction using two sets of planetary gear mechanisms 30 and 31. The planetary gear mechanisms 30 and 31 may be single pinion type but also be double pinion type. In the example shown in FIG. 2, however, single pinion type planetary gear mechanisms are employed. Specifically, the planetary gear mechanisms 30 and 31 perform a differential action using rotary elements such as sun gears S1 and S2 as external gears, ring gears R1 and R2 as internal gears arranged concentrically around the sun gears S1 and S2, and carriers CA1 and CA2 holding pinion gears arranged between the sun gears S1 and S2 and the ring gears R1 and R2 and meshing with the sun gear and the ring gear.

The carrier CA1 of the first planetary gear mechanism 30 and the ring gear R2 of the second planetary gear mechanism 31 are connected with each other, and the ring gear R1 of the first planetary gear mechanism 30 and the carrier CA2 of the second planetary gear mechanism 31 are connected with each other. That is, the planetary gear mechanisms 30 and 31 function as a so-called "CR-CR coupled type complex planetary gear mechanism".

In order to transmit a power selectively to the complex planetary gear mechanism, there are provided three clutch mechanisms C1, C2 and C3. For example, those clutch mechanisms C1, C2 and C3 are hydraulic frictional engagement devices. The first clutch mechanism C1 is arranged between the input shaft 7 and the sun gear S2 of the second planetary gear mechanism 31. The second clutch mechanism C2 is arranged between the carrier CA1 of the first planetary gear mechanism 30 and the input shaft 7. The third clutch mechanism C3 is arranged between the sun gear S1 of the first planetary gear mechanism 30 and the input shaft 7.

In addition, there are provided a first brake mechanism B1 for selectively fixing the sun gear S1 of the first planetary gear mechanism 30, and a second brake mechanism B2 for selectively fixing the ring gear R2 of the second planetary gear mechanism 31. A hydraulic multi-disc brake or a band brake can be used as the brake mechanisms B1 and B2. Also, a one-way clutch F1 is arranged in parallel with the second brake mechanism B2. The one-way clutch F1 is adapted to be engaged to halt an integral rotation of the carrier CA1 of the first planetary gear mechanism 30 and the ring gear R2 of the second planetary gear mechanism 31 in the direction opposite to the rotational direction of the input shaft 7. Further, an output shaft 32 is connected with the carrier CA2 of the second planetary gear mechanism 31. The output shaft 32 is arranged coaxially with the aforementioned input shaft 7, and protrudes from the casing 3.

Next, here will be explained the power distribution mechanism 26. The power distribution mechanism 26 is a mechanism comprising a planetary gear mechanism, and distributing a power outputted from an internal combustion engine 33 to a motor generator (M1) 34 and to the transmission unit 1. Both single and double pinion type planetary gear mechanisms capable of performing a differential action using three rotary elements may be used. In the example shown in FIG. 2, a single pinion type planetary gear mechanism is employed. The planetary gear mechanism is adapted to function as a speed increasing mechanism. Specifically, the internal combustion engine 33 is connected with a carrier CA0, the motor generator 34 is connected with a sun gear S0, and the output shaft 27 is connected with a ring gear R0.

The output shaft 27 of the power distribution mechanism 26 is also connected with the input shaft 7 of the transmission unit 1, and the rotor 13 of the aforementioned electric motor (M2) 2 is connected with those output shaft 27 and input shaft 7. Here, the motor generator 34 may also be a generator, and the electric motor 2 may also be a motor generator having a generating function. The motor generator 34 and the electric motor 2 are connected with a battery through a controller such as a (not shown) inverter. A drive torque, a generation torque, a generation amount and so on of the motor generator 34 and the electric motor 2 are controlled by controlling the inverter by an electronic control unit.

As shown in FIG. 3, the transmission unit 1 composed mainly of the aforementioned two sets of the planetary gear mechanisms 30 and 31 is capable of setting four forward stages and one reverse stage by engaging and releasing the clutch mechanisms C1, C2 and C3, the brake mechanisms B1 and B2, and one-way clutch F1. FIG. 3 is a table indicating an engagement of the aforementioned elements, i.e., clutch and brake mechanisms. Here, in FIG. 3, "○" represents an "engagement" of the element, a blank means that the element is released, and "(○)" represents that the element is engaged to apply power source braking (or engine braking). The clutch mechanisms C1, C2 and C3, the brake mechanisms B1 and B2 are controlled to be engaged and released by an oil pressure outputted from the hydraulic control unit.

Next, here will be explained a procedure (or method) of assembling the aforementioned power transmission unit. First of all, before fixing the bulkheads 4 and 19 to the casing 3, the components of the transmission unit 1 are inserted into the casing 3 sequentially from the wider opening (of the side where the internal combustion engine 33 is to be placed after a completion of assembling), and the inserted components are assembled in the casing 3. Then, the bulkhead 4 is engaged with the spigot joint portion 9 formed on an inner circumference of the casing 3 while inserting the input shaft 7 of the transmission 1 into the boss portion 8 of the bulkhead 4, and fixed with the casing 3 by a bolt 10. The chamber 5 housing the transmission unit 5 is thus closed, and the input shaft 7 is held by the boss portion 8 through the bearing 11 in a rotatable manner.

Figure 4:
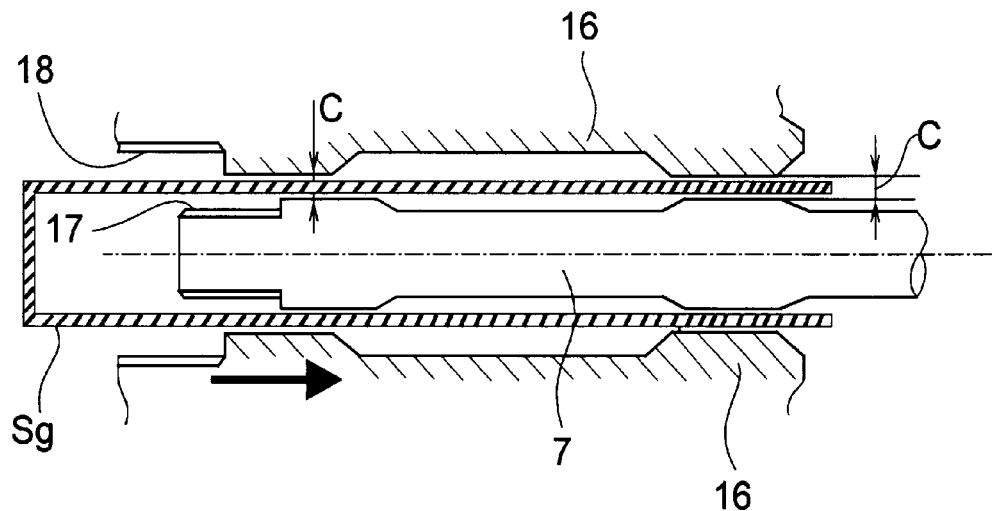
FIG. 4 is a diagram showing a process of inserting the rotor using the guide sleeve.

After that, the stator 12 of the electric motor 2 is inserted into the inner circumference of the casing 3. In this situation, the input shaft 7 protrudes coaxially with the stator 12. As schematically shown in FIG. 4, a guide sleeve Sg is fitted onto the protruding portion of the input shaft 7. The guide sleeve Sg is a cylindrical member made of material having hard surface hardness such as metal. An inner diameter of the guide sleeve Sg is substantially identical to maximum outer diameter of the input shaft 7, and an outer diameter of the guide sleeve Sg is substantially identical to an inner diameter of the cylindrical portion 16. In other words, the guide sleeve Sg is a cylindrical body whose thickness is substantially identical to a width of the clearance C. Here, the input shaft 7 comprises portions where an outer diameter thereof is largest at portions closer to a base end side thereof from the portion where the spline 17 is formed. That is, outer circumferential faces of those portions of the maximum diameter of the input shaft 7 correspond to the guide portion of the invention.

The guide sleeve Sg is fitted tightly onto the input shaft 7 protruding coaxially with the stator 12 so that the guide sleeve Sg is also kept coaxially with the stator 12. For this reason, when the cylindrical portion 16 of the rotor 13 is fitted onto the outer circumferential face of the guide sleeve Sg, the rotor 13 is centered while being kept coaxially with the stator 12. In this situation, when the rotor 13 is moved to the inner circumferential side of the stator 12, the rotor 13 is slid in the axial direction while being centered coaxially with the stator 12. Therefore, the rotor 13 can be inserted into the inner circumference of the stator 12 without being contacted to the stator 12. Then, when the rotor 13 reaches a predetermined point, an end portion of the cylindrical portion 16 is fitted into the bearing 20 attached in advance to the bulkhead 4. as a result, the rotor 13 is held in a rotatable manner by the bulkhead through the bearing 20.

According to the construction or method of the present invention as thus far explained, therefore, the rotor 13 can be easily inserted into the stator 12 as if the rotor 13 is held at its both ends when inserted, even if one of the end side of the chamber 6 for housing the electric motor 2 is closed by the bulkhead 4 or by the transmission 1.

After thus inserting the rotor 13 into the inner circumference of the stator 12, another bulkhead 19 is inserted into the casing 3 and fixed to the inner circumferential face of the casing 3. In this case, the rotor 23 of the resolver 22 is fitted onto the cylindrical portion 16, and the stator 24 of the resolver 22 is fixed to the inner face of another bulkhead 19 in advance. Also, the bearing 21 is fitted onto the outer circumferential face of other end of the cylindrical portion 16 or fitted into an inner circumferential portion of another bulkhead 19 in advance. Therefore, the other end of the cylindrical portion 16 is held by the aforementioned another bulkhead 19 through the bearing 21 in a rotatable manner. That is, the rotor 13 is held by the bulkheads 4 and 19 through the bearings 20 and 21 in a rotatable manner.

In this case, the rotor 13 is held by the guide sleeve Sg fitted tightly onto the input shaft 7 protruding along the center axis of the stator 12 so that the rotor 13 is centered by the guide sleeve Sg. Therefore, an end portion of the rotor 13 can be fitted easily into the bearing 21 when installing said another bulkhead 19. Thus, an installation of another bulkhead 19 can be carried out easily. Moreover, the rotor 13 can be prevented form being contacted with the stator 12 when installing another bulkhead 19.

Then, after installing said another bulkhead 19, the guide sleeve Sg is dismounted from the input shaft 7. At this stage, the rotor 13 is held at its both ends by the bulkheads 4 and 19, therefore, the guide sleeve Sg is scarcely subjected to a load. For this reason, the guide sleeve Sg can be dismounted from the input shaft 7. In addition, the rotor 13 is held concentrically with the stator 12 by the bearings 20 and 21 even after dismounting the guide sleeve Sg. Therefore, the rotor 13 will not be contacted with the stator 12 when dismounting the guide sleeve Sg.

After dismounting the guide sleeve Sg, a clearance C is created between the outer circumferential face of the input shaft 7 and the inner circumferential face of the cylindrical portion 16. A width of the clearance C is comparable with the thickness of the guide sleeve Sg. Consequently, the input shaft 7 and the rotor 13 are isolated sufficiently from each other. Here, since the output shaft 27 of the power distribution mechanism 26 is not yet inserted at this stage, the input shaft 7 and the rotor 13 are not yet connected with each other. Therefore, the electric motor 2 can be activated independently, and this allows to carry out a torque measurement of the electric motor 2 and a tuning of the resolver 22 easily and accurately irrespective of the transmission 1.

Figure 5:
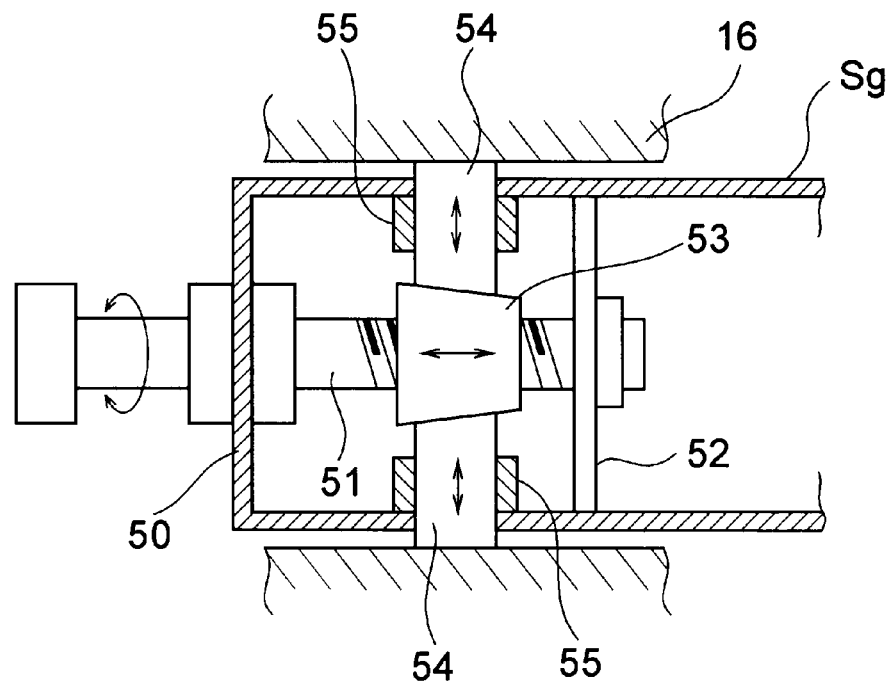
FIG. 5 is a diagram showing one example of the guide sleeve fitted with a mechanism for centering the rotor.

As explained above, the guide sleeve Sg has functions to center the rotor 13 and to hold the rotor 13. FIG. 5 shows an example for utilizing those functions in a positive manner. More particularly, although the present invention should not be limited to the example shown in FIG. 5, FIG. 5 shows an example of providing the guide sleeve Sg with an inner chuck. Specifically, a rear end of the guide sleeve Sg is closed by an end plate 50. A screw shaft 51 penetrates a center of the end plate 50 and held by the end plate 50 in a rotatable manner. Meanwhile, a leading end of the screw shaft 51 is held in a rotatable manner by a supporting plate 52 fixed in the guide sleeve Sg. Thus, the screw shaft 51 extends along the center axis of the guide sleeve Sg.

A tapered cone 53 is fitted onto an outer circumferential face of the screw shaft 51, and the tapered cone 53 is not allowed to rotate. That is, the tapered cone 53 is moved back and forth in an axial direction by rotating the screw shaft 51. The tapered cone 53 is provided with a plurality of chuck claws 54 arranged radially around an outer circumferential face of the tapered cone 53. The chuck claws 54 are pressed elastically toward the center of the guide sleeve Sg to be contacted with the outer circumferential face of the tapered cone 53. For example, the chuck claws 54 are bundled by an (not shown) elastic ring or band. The chuck claw 54 is held by a guide 55 and allowed to move in a radial direction of the guide sleeve Sg to penetrate the outer circumferential face of the guide sleeve Sg.

According to the example shown in FIG. 5, therefore, when the tapered cone 53 is moved backwardly (i.e., to the left side in FIG. 5) by rotating the screw shaft 51, the chuck claws 54 are moved inward of the guide sleeve Sg. As a result, a diameter of a circle around the outer circumferential faces of the chuck claws 54 becomes smaller than an inner diameter of the cylindrical portion 16 of the rotor 13, and the rotor 13 is therefore allowed to be fitted onto the outer circumferential face of the guide sleeve Sg. To the contrary, when the tapered cone 53 is moved in a forward direction (i.e., to the right side of FIG. 5), the chuck claws 54 are pushed out of the guide sleeve Sg. Therefore, the chuck claws 54 are pushed to the inner circumferential face of the cylindrical portion 16 by fitting the rotor 13 onto the outer circumferential face of the guide sleeve Sg. As a result, the rotor 13 is centered and held by the guide sleeve Sg.

Here, in the example thus far explained, the present invention is applied to the power transmission unit of a hybrid drive unit. However, the present invention should not be limited to the aforementioned example. This means that the present invention may also be applied to other kinds of power transmission units such as a power transmission unit in an electric vehicle. On the other hand, the transmission mechanism used in the present invention should not be limited to the aforementioned planetary gear type geared transmission mechanism but a transmission mechanism without speed changing function may also be used. According to the invention, the electric motor also should not be limited to the permanent magnetic type electric motor but other kinds of appropriate electric motor may also be used. Further, the connection member used in the present invention should not be limited to the output shaft 27 of the power distribution mechanism 26 but other kinds of appropriate member may also be used as the connection member. Additionally, the means for transmitting torque should not be limited to the spline but may also be an engaging means for integrating members in a rotational direction such as a serration and a slide key.

The invention claimed is:

1. A power transmission unit comprising:
   an electric motor having a rotor arranged in an inner circumference of a stator and concentrically with the stator; and
   a transmission mechanism for transmitting power;
   wherein a protruding portion of a predetermined constructional element of the transmission mechanism protrudes toward the stator or the rotor side coaxially with the stator or the rotor;
   the rotor is loosely fitted onto an outer circumferential face of the protruding portion;
   a clearance is created between an outer circumferential face of the protruding portion and an inner circumferential face of the rotor, wherein a guide sleeve that guides the rotor in an axial direction is configured to be inserted into the clearance; and
   the protruding portion includes a guide portion on a portion of the outer circumferential face thereof closer to a base end side thereof than a leading end portion thereof, on which the guide sleeve is fitted in close contact.

2. The power transmission unit as claimed in claim 1, wherein:
   the protruding portion includes a shaft for transmitting a power to the transmission mechanism; and
   a connection member for connecting the shaft and the rotor in a torque transmittable manner is interposed between the rotor and the shaft.

3. The power transmission unit as claimed in claim 2, wherein:
   the rotor is positioned concentrically with the stator by the sleeve.

4. The power transmission unit as claimed in claim 1, wherein:
   the rotor is positioned concentrically with the stator by the sleeve.

5. The power transmission unit as claimed in claim 1, wherein:
   the protruding portion includes a shaft for transmitting a power to the transmission mechanism; and
   a connection member for connecting the shaft and the rotor in a torque transmittable manner is interposed between the rotor and the shaft.

6. The power transmission unit as claimed in claim 5, wherein:
   the rotor is positioned concentrically with the stator by the sleeve.

7. The power transmission unit as claimed in claim 1, wherein:
   the rotor is positioned concentrically with the stator by the sleeve.

* * * * *